United States Patent
Lupsa et al.

(10) Patent No.: US 10,451,198 B2
(45) Date of Patent: Oct. 22, 2019

(54) CABLE TRAY HOLD-DOWN CLAMP

(71) Applicant: THOMAS & BETTS INTERNATIONAL LLC, Wilmington, DE (US)

(72) Inventors: Ioan Liviu Lupsa, Dollard-des-Ormeaux (CA); Daniel Cardin, Sainte-Julie (CA); David Gingras, Saint-Jean-sur-Richelieu (CA)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/992,432

(22) Filed: May 30, 2018

(65) Prior Publication Data

US 2018/0363807 A1    Dec. 20, 2018

Related U.S. Application Data

(60) Provisional application No. 62/521,607, filed on Jun. 19, 2017.

(51) Int. Cl.
| | |
|---|---|
| *F16B 2/02* | (2006.01) |
| *F16L 3/26* | (2006.01) |
| *F16B 2/00* | (2006.01) |
| *F16B 9/02* | (2006.01) |
| *F16B 2/06* | (2006.01) |
| *F16B 2/12* | (2006.01) |
| *F16B 7/04* | (2006.01) |

(Continued)

(52) U.S. Cl.
CPC ............... *F16L 3/26* (2013.01); *F16B 2/005* (2013.01); *F16B 2/065* (2013.01); *F16B 2/12* (2013.01);

(Continued)

(58) Field of Classification Search
CPC .... F16L 3/26; F16B 2/005; F16B 2/00; F16B 2/02; F16B 2/20; F16B 2/241; F16B 2/24; F16B 9/065; F16B 9/023; F16B 2/10; F16B 2/065; F16B 7/04; F16B 7/044; F16B 37/045; F16B 9/054; A47B 97/00; H02G 3/263

(Continued)

(56) References Cited

U.S. PATENT DOCUMENTS

| | | | | |
|---|---|---|---|---|
| 2,175,453 A | * | 10/1939 | Barcy | E04B 1/2612 |
| | | | | 403/256 |
| 2,470,992 A | * | 5/1949 | Kindorf | F16L 3/24 |
| | | | | 248/72 |

(Continued)

*Primary Examiner* — Nkeisha Smith
(74) *Attorney, Agent, or Firm* — Taft Stettinius & Hollister LLP; J. Bruce Schelkopf (57) ABSTRACT

A hold-down clamp for holding a cable tray on a strut channel includes a main body member extending between first and second ends, opposed side walls extending downwardly and perpendicularly from the main body member, and first and second side members extending from each of the opposed side walls. The main body member has a first end defining a clamp engagement portion and a second end defining an expansion guide portion. Each of the first and second side members includes a flange having a clamp engagement structure, a planar middle structure, and an expansion guide structure that are integrally connected to each other, and a clamping tooth, which is defined between the clamp engagement structure of the flange and the side wall such that the clamping tooth transitions into the clamp engagement structure of the flange and the side wall of the hold-down clamp.

23 Claims, 8 Drawing Sheets

(51) Int. Cl.
*F16B 37/04* (2006.01)
*F16B 9/00* (2006.01)
*H02G 3/00* (2006.01)
*H02G 3/04* (2006.01)

(52) U.S. Cl.
CPC .............. *F16B 7/044* (2013.01); *F16B 9/023* (2013.01); *F16B 9/054* (2018.08); *F16B 37/045* (2013.01); *H02G 3/263* (2013.01); *H02G 3/0456* (2013.01)

(58) Field of Classification Search
USPC .................................. 248/72, 500, 309.1, 49
See application file for complete search history.

(56) References Cited

U.S. PATENT DOCUMENTS

| 3,494,646 | A | * | 2/1970 | Cumber | F16B 5/06 403/190 |
| 5,100,086 | A | * | 3/1992 | Rinderer | H02G 3/263 248/49 |
| 5,372,341 | A | * | 12/1994 | Witherbee | H02G 3/263 248/49 |
| 6,588,711 | B2 | * | 7/2003 | Onishi | F16B 37/045 248/221.11 |
| 7,055,786 | B2 | * | 6/2006 | Garassino | H02G 3/263 248/220.22 |
| 7,237,996 | B2 | * | 7/2007 | Vrana | B23P 19/062 206/345 |
| 7,823,853 | B2 | * | 11/2010 | Larson | F16B 45/00 24/370 |
| 8,899,544 | B2 | * | 12/2014 | Meredith, Jr. | H02G 3/263 248/309.1 |
| 9,528,635 | B2 | * | 12/2016 | Lowe | F16B 1/00 |
| 9,571,031 | B2 | * | 2/2017 | Cavieres | F16B 2/241 |
| 9,689,411 | B2 | * | 6/2017 | Meine | F16B 2/12 |
| 9,985,361 | B2 | * | 5/2018 | Martin | H01R 4/40 |
| 2008/0310913 | A1 | * | 12/2008 | Urban | F16B 7/0493 403/404 |
| 2016/0018026 | A1 | * | 1/2016 | Shelton | H02G 3/263 248/65 |

* cited by examiner

CABLE TRAY HOLD-DOWN CLAMP

CROSS REFERENCE TO RELATED APPLICATION

This application claims priority to U.S. Provisional Patent Application No. 62/521,607, filed on Jun. 19, 2017, the contents of which are incorporated herein by reference in its entirety.

FIELD OF THE INVENTION

The present invention relates to hold-down clamps, and more particularly, to cable tray hold-down clamps configured to rigidly retain cable trays on strut channels or other types of support members.

BACKGROUND OF THE INVENTION

Cable tray hold-down clamps are used to hold cable trays on struts or on other types of support members. Currently, there are various hold-down clamps available in the market with different designs and configurations. However, these hold-down clamps have several disadvantages. First, the currently available hold-down clamps provide relatively low pull retention of the cable tray. Each one of these hold-down clamps holds a cable tray on a support member by pressing a side rail flange of the cable tray against the support member, providing only a friction force to retain the cable tray on the support member. Thus, when a significant pull force is applied in a longitudinal direction relative to the cable tray, the friction force does not retain the cable tray, causing the cable tray to slide. Second, the hold-down clamps currently available in the market are relatively weak and may bend when a high torque is applied to mount a clamping screw during installation.

Accordingly, although various hold-down clamps are currently available in the marketplace, further improvements are possible.

SUMMARY OF THE INVENTION

According to an embodiment of the present invention, a hold-down clamp for holding a cable tray on a strut channel includes a main body member having a first end defining a clamp engagement portion and a second end defining an expansion guide portion, opposed side walls that extend downwardly and perpendicularly from the main body member, and first and second side members that extend from each of the opposed side walls. Each of the first and second side members includes a flange having a clamp engagement structure, a planar middle structure, and an expansion guide structure that are integrally connected to each other, and a clamping tooth, which is defined between the clamp engagement structure of the flange and the side wall such that the clamping tooth transitions into the clamp engagement structure of the flange and the side wall of the hold-down clamp.

According to another embodiment of the present invention, a hold-down clamp for holding a cable tray on a strut channel includes a main body member having a first end defining a clamp engagement portion and a second end defining an expansion guide portion, opposed side walls that extend downwardly and perpendicularly from the main body member with a clamping tooth at the bottom, and opposed flanges that extend from each of the side wall and having a clamp engagement structure, a planar middle structure, and an expansion guide structure that are integrally connected to each other.

These and other aspects of the present invention will be better understood in view of the drawings and following detailed description.

DETAILED DESCRIPTION OF PREFERRED EMBODIMENTS

Figure 1:
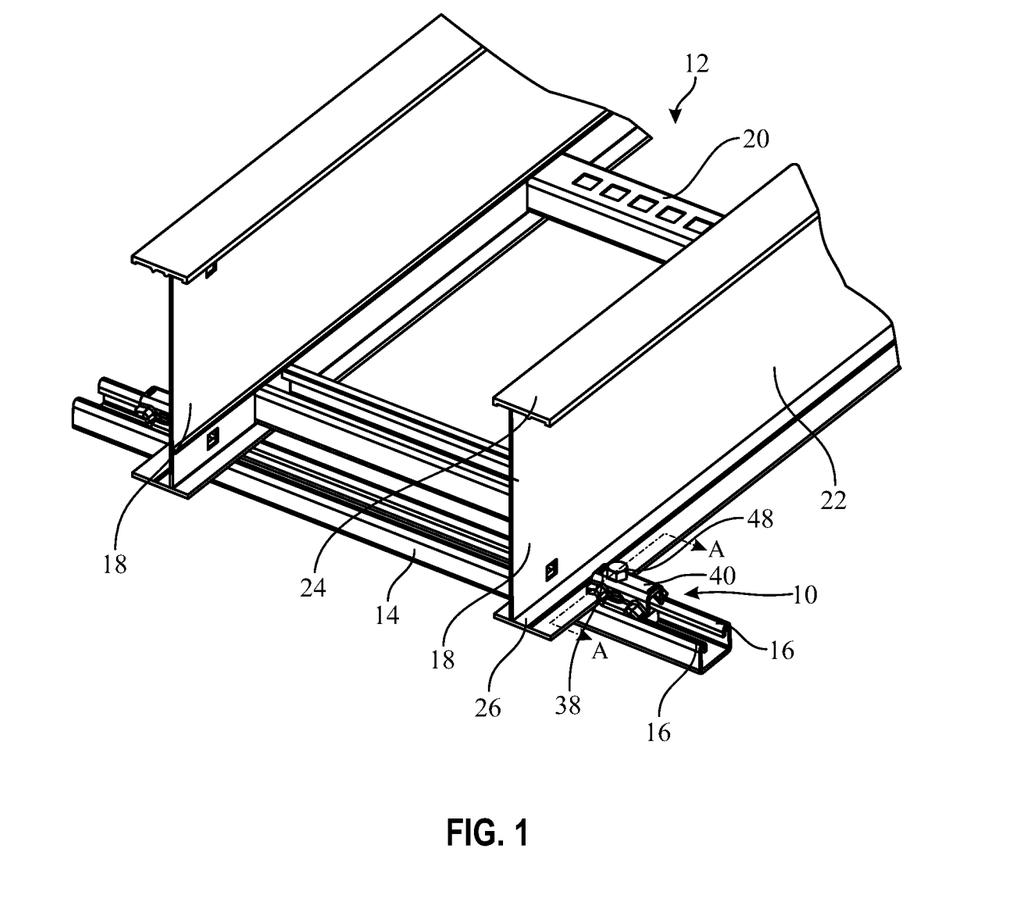
FIG. 1 is a perspective view of a hold-down clamp, according to an embodiment of the present invention, with a clamp engagement portion of the hold-down clamp installed to hold a cable tray on a support member.
Figure 2:
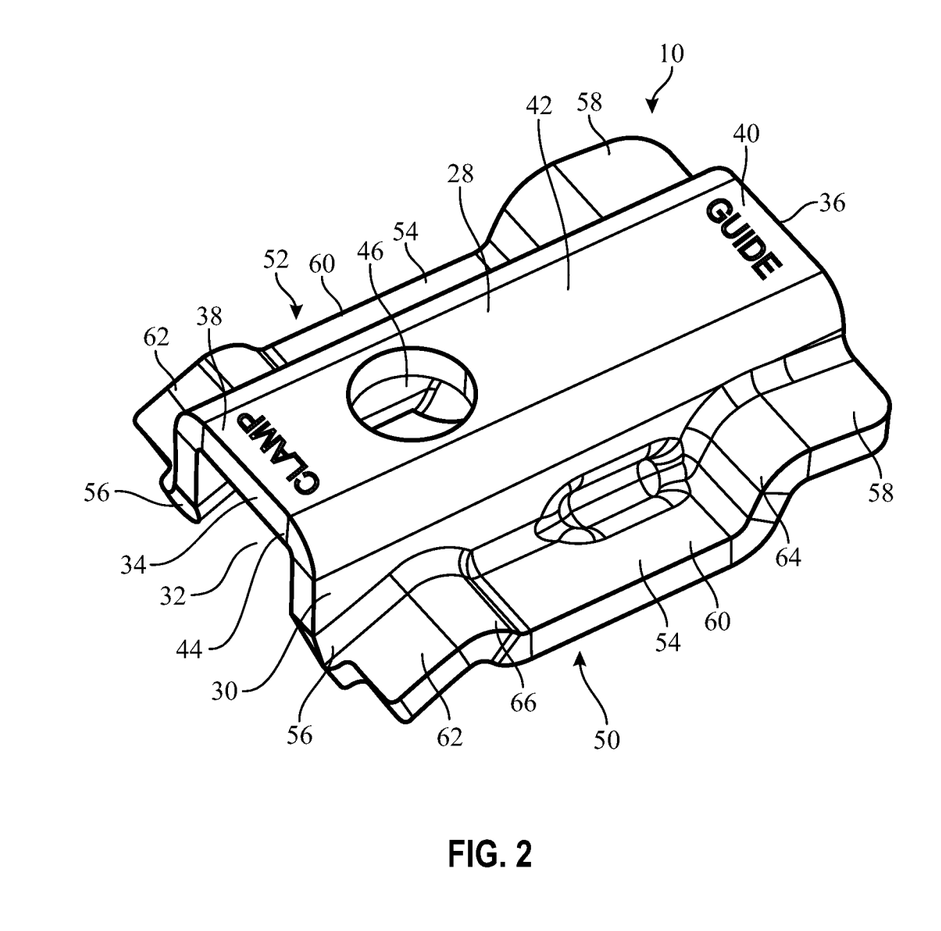
FIG. 2 is a perspective view of the hold-down clamp in FIG. 1.

According to an embodiment of the present invention, referring to FIGS. 1 and 2, there is shown a cable tray hold-down clamp 10 configured to hold a cable tray 12 on a support member 14, e.g., a strut channel. When the hold-down clamp 10 is installed on the cable tray 12, as shown in FIG. 1, its design and configuration allow it to firmly and rigidly retain the cable tray 12 on the strut channel 14, thereby preventing the cable tray 12 from sliding and separating from the hold-down clamp 10 and strut channel 14, as will be described in greater detail below.

FIG. 1 illustrates the hold-down clamp 10 that is disposed on inturned members 16 of the strut channel 14 and holding down the cable tray 12. The cable tray 12 generally includes parallel opposed side rails 18, a plurality of rungs 20 adapted to connect between the side rails 18 to fix a spacing therebetween. Each side rail 18 includes a vertical web 22, and horizontal upper and lower flanges 24, 26 connected and separated by the web 22. The upper and lower flanges 24, 26 are substantially perpendicular to the web 22.

Referring again to FIGS. 1 and 2, in the depicted embodiment, the hold-down clamp 10 includes a generally rectangular main body member 28 and opposed side walls 30 that extend downwardly and perpendicularly from the main body member 28, such that an inner space 32 is defined therebetween and underneath the main body member 28. The main body member 28 extends between a first end 34 and a second end 36, defining a clamp engagement portion 38 and an expansion guide portion 40, respectively, with flat top and bottom surfaces 42, 44. The expansion guide portion 40 of the hold-down clamp 10 is configured to loosely engage and hold the cable tray 12 to the strut channel 14, whereas the clamp engagement portion 38 is configured to rigidly hold the cable tray 12 to the strut channel 14, as will be described in greater detail below.

A fastener hole 46 is defined in the clamp engagement portion 38 of the main body member 28 and extends between the top and bottom surfaces 42, 44 of the main body member 28. A clamping fastener 48, e.g., a threaded bolt, is inserted through the fastener hole 46 to tighten the hold-down clamp 10 to hold the cable tray 12 to the strut channel 14.

Figure 3:
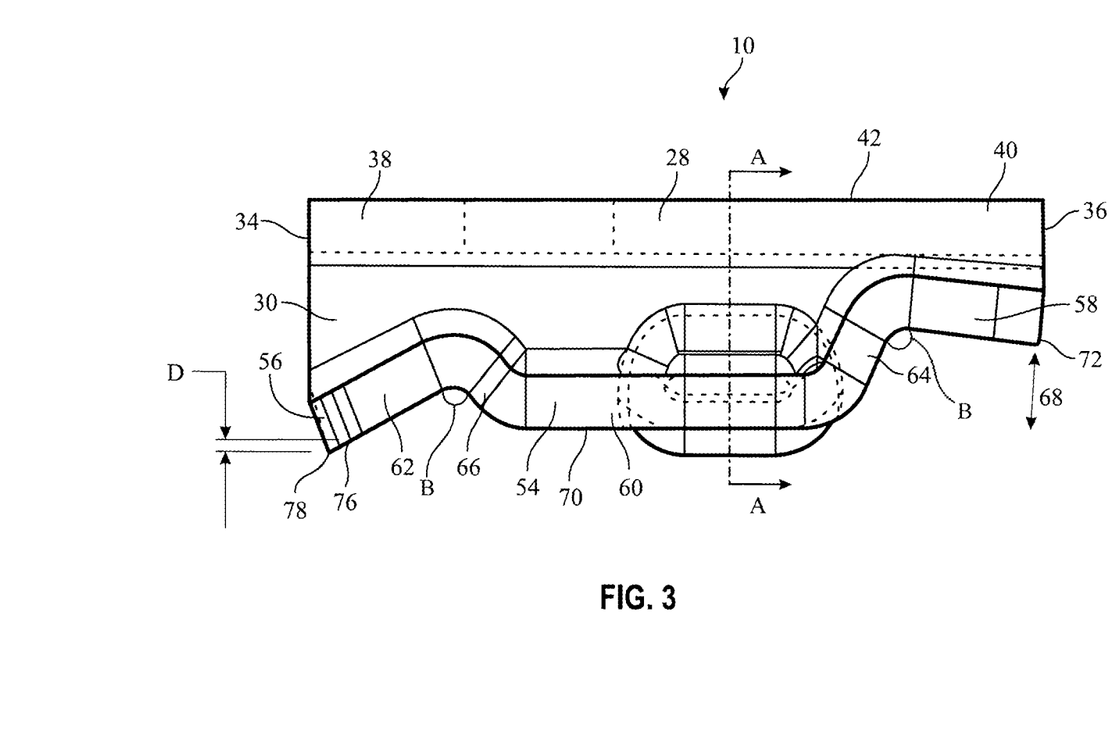
FIG. 3 is a side view of the hold-down clamp in FIG. 1.

Referring to FIGS. 2 and 3, the hold-down clamp 10 further includes first and second side members 50, 52, each of which extends from each side wall 30. Each of the first and second side members 50, 52 includes a flange 54 and a clamping tooth 56 for clamping engagement with the lower flange 26 of the side rail 18 of the cable tray 12. The flange 54 includes an expansion guide structure 58, a planar middle structure 60, and a clamp engagement structure 62 that transitions into the clamping tooth 56. The expansion guide and clamp engagement structures 58, 62 are integrally connected and separated by the middle structure 60. Specifically, the expansion guide and clamp engagement structures 58, 62 are connected to the middle structure 60 via first and second offsets 64, 66, respectively, and extend away therefrom. In addition, each of the expansion guide and clamp engagement structures 58, 62 extends downwardly with an angle relative to the first offset 64 and the second offset 66, respectively, such that an obtuse angle B is created therebetween.

The expansion guide structure 58 is dimensioned and configured such that an expansion guide vertical clearance 68 is created between a bottom 70 of the middle structure 60 and a lower edge 72 of the expansion guide structure 58. When the hold-down clamp 10 is installed on the cable tray 12, the middle structure 60 of the flange 52 abuts and rests on the inturned members 16 of the strut channel 14 such that it is substantially parallel to the strut channel 14.

Referring again to FIG. 2, the clamping tooth 56 is curved and defined between the clamp engagement structure 62 of the flange 52 and the side wall 30 such that the clamping tooth 56 transitions into the clamp engagement structure 62 of the flange 52 and the side wall 30 of the hold-down clamp 10. Once the hold-down clamp 10 is installed on the cable tray 12, the clamping tooth 56 engages with the lower flange 26 of the side rail 18 of the cable tray 12, as will be described in greater detail below.

Figure 4:
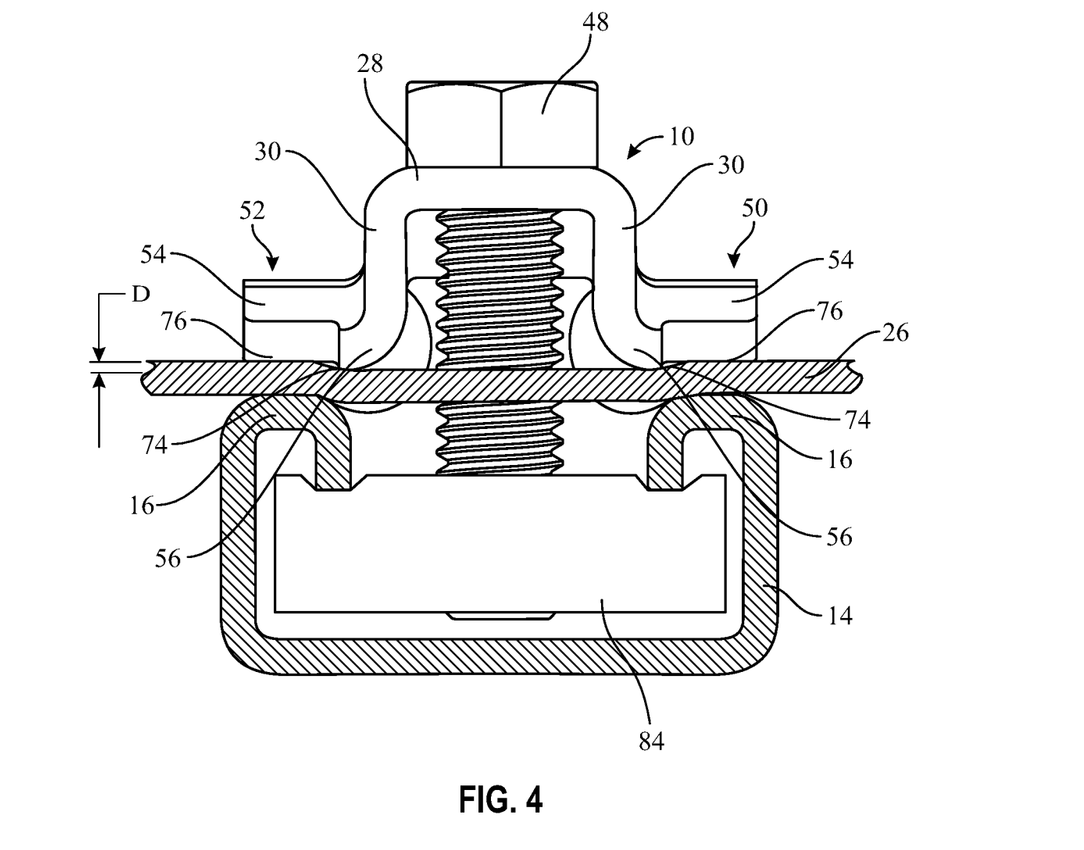
FIG. 4 is a sectional view taken along line A-A of FIG. 1.

To install the hold-down clamp 10 to hold the cable tray 12 to the strut channel 14, first, the clamp engagement portion 38 of the hold-down clamp 10 is placed over the lower flange 26 of the side rail 18 of the cable tray 12, such that each of the clamping teeth 56 of the hold-down clamp 10 engages and rests on the lower flange 26 of the side rail 18 of the cable tray 12. Thereafter, the clamping fastener 48 is inserted through the fastener hole 46 in the main body member 28 and tightened to secure the hold-down clamp 10 to the cable tray 12. As the clamping fastener 48 is tightened, the clamping teeth 56 of the hold-down clamp 10 move downward and exert strong pressing force against the lower flange 26 of the side rail 18 until the clamp engagement structures 62 of the flanges 54 engage and press the lower flange 26 of the side rail 18 against the inturned members 16 of the strut channel 14. This downward movement of the clamping teeth 56 allows a deformation 74 to be formed in the lower flange 26 of the side rail 18, with its height equivalent to a distance D between a lower edge 76 of the clamp engagement structure 62 of the flange 54 and a bottom 78 of the clamping tooth 56, as shown in FIGS. 3 and 4. Advantageously, when the cable tray 12 is pulled in a longitudinal direction, the deformation 74 acts as a mechanical key, thereby allowing the hold-down clamp 10 to firmly and rigidly retain the cable tray 12 on the strut channel 14 by preventing the cable tray 12 from sliding and separating from the hold-down clamp 10 and strut channel 14.

Figure 5:
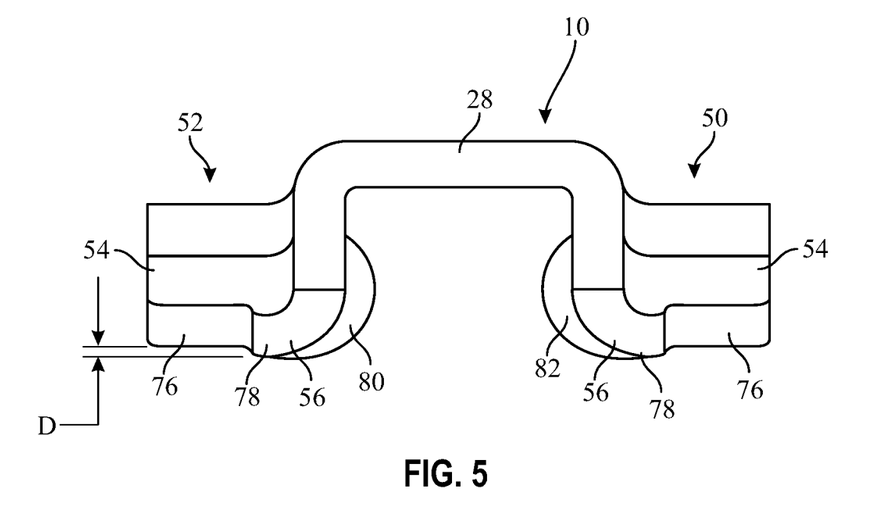
FIG. 5 is a view of the hold-down clamp in FIG. 1 from the clamp engagement portion of the hold-down clamp.
Figure 6:
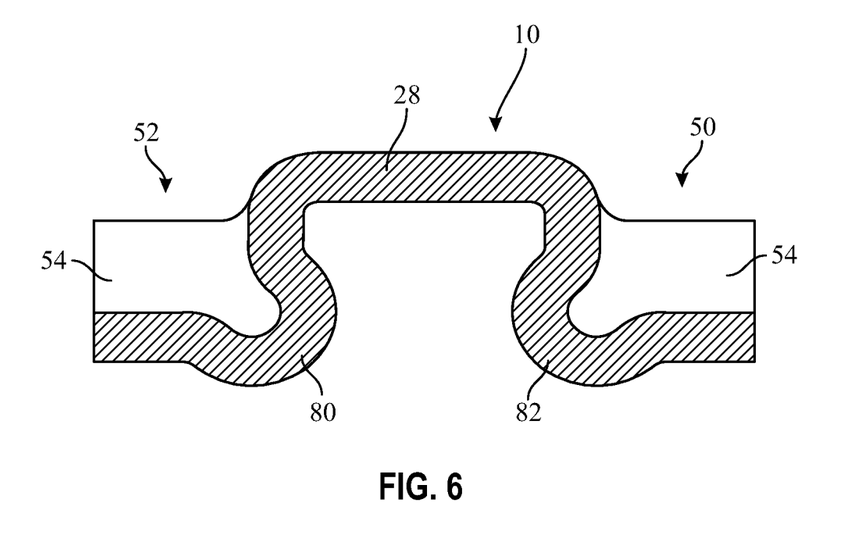
FIG. 6 is a sectional view taken along line A-A of FIG. 3.

Referring to FIGS. 4-6, first and second anti-rotation embossments 80, 82 are defined and integrally formed on the side walls 30 to maintain the hold-down clamp 10 in a fixed position on the strut channel 14. Specifically, each of the first and second anti-rotation embossments 80, 82 protrudes from an inner surface of each of the side walls 30 to prevent the hold-down clamp 10 from rotating, moving and bending, as the clamping fastener 48 is tightened to secure the hold-down clamp 10 to the strut channel 14. In addition, a strut nut 84 is disposed within an inner space of the strut channel 14 and rigidly engaged with the inturned members 16 of the strut channel 14, while the clamping fastener 48 is inserted and rotated through the fastener hole 46.

Figure 7:
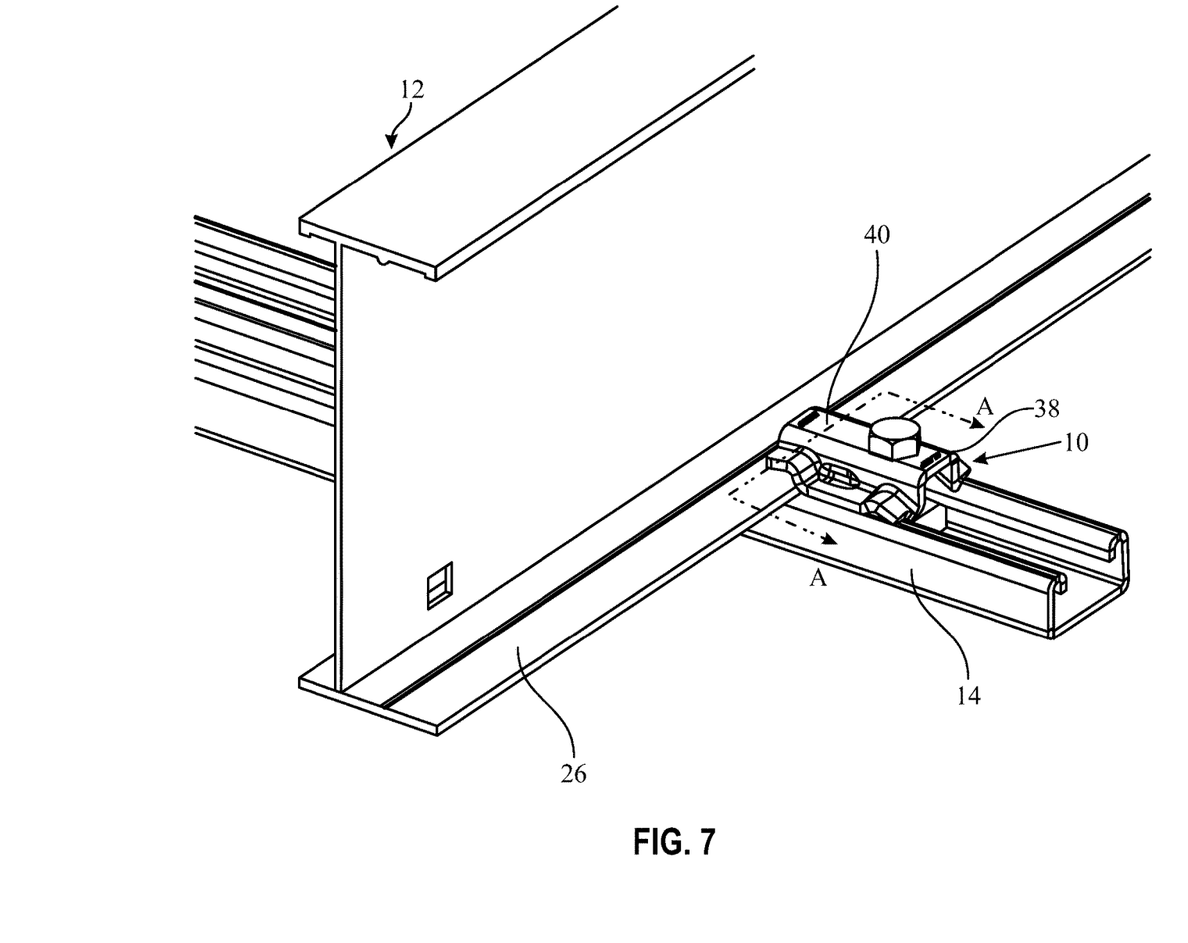
FIG. 7 is a perspective view of the hold-down clamp in FIG. 1, with an expansion guide portion of the hold-down clamp installed to hold a cable tray on a support member.
Figure 8:
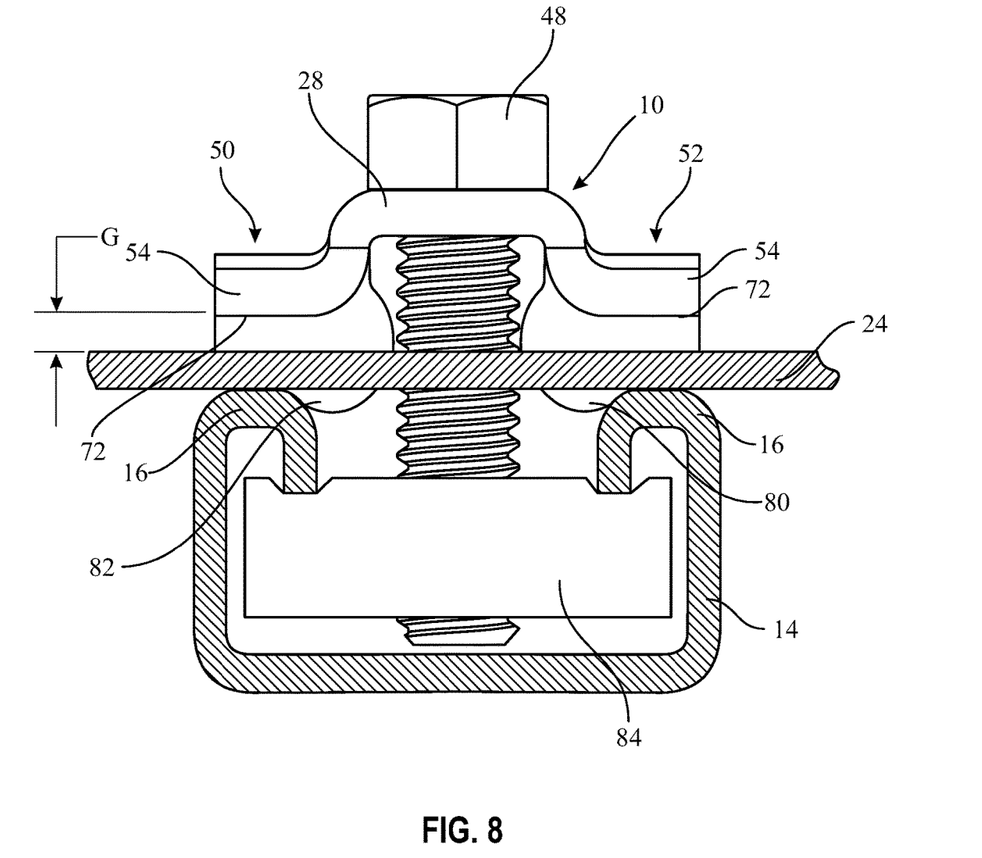
FIG. 8 is a sectional view taken along line A-A of FIG. 7.

The hold-down clamp 10 may also be mounted on the strut channel 14 with the expansion guide portion 40 applied to the lower flange 26 of the side rail 18 of the cable tray 12, as shown in FIG. 7. Once the expansion guide portion 40 of the hold-down clamp 10 is installed to the cable tray 12, the expansion guide portion vertical clearance 68 provides a gap G between the lower edge 72 of the expansion guide structure 58 of the flange 54 and the lower flange 26 of the side rail 18 to allow thermal expansion and contraction of the cable tray 12 relative to the strut channel 14, as shown in FIG. 8. In this configuration, the clamping teeth 56 are positioned within the inner space of the strut channel 14 and act as an anti-rotation feature to prevent the hold-down clamp 10 from rotating and moving, as the clamping fastener 48 is tightened.

Figure 9:
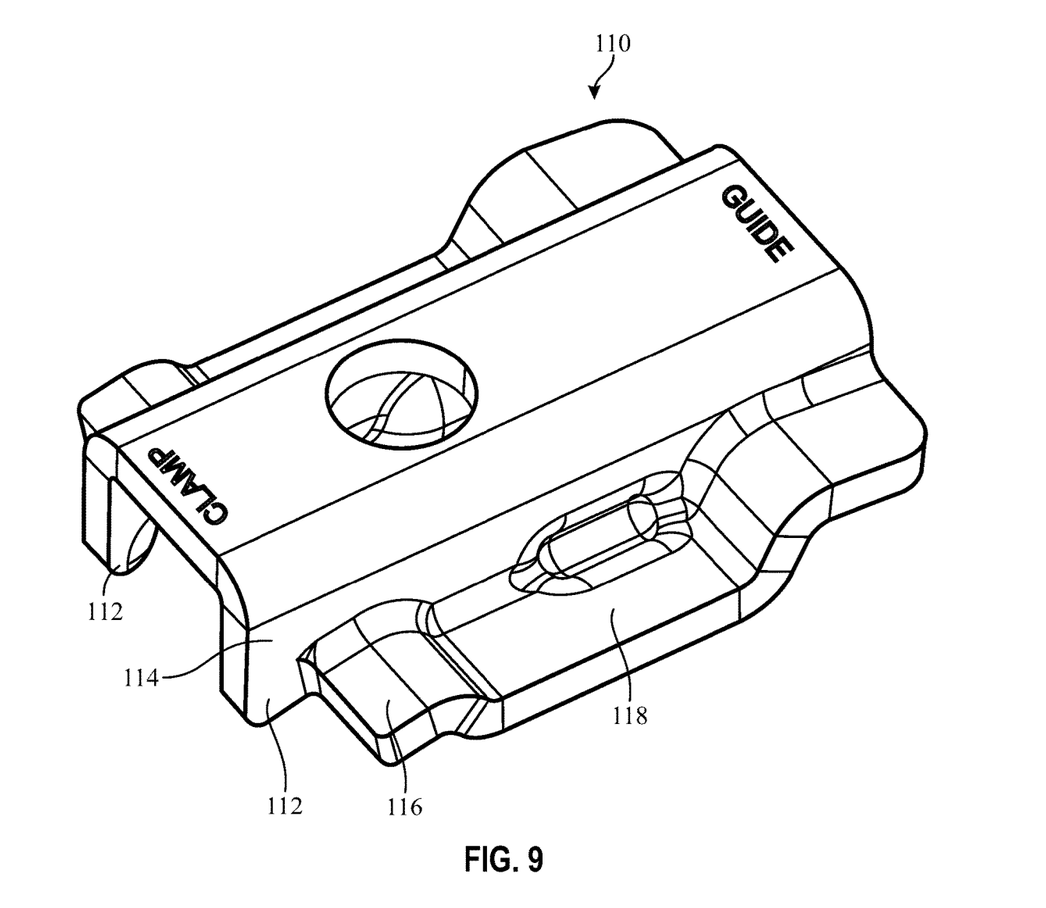
FIG. 9 is a perspective view of a hold-down clamp, according to another embodiment of the present invention.

Referring to FIG. 9, in an alternate embodiment, there is shown a hold-down clamp 110, which is constructed similar to the embodiment described above. The hold-down clamp 110 has all the features included in the embodiment described above. In this embodiment, a clamping tooth 112 is defined at bottom of each side wall 114. In addition, a clamp engagement structure 116 of each flange 118 is integrally connected to each side wall 114.

The hold-down clamp 10, 110 is made of one or more materials having suitable properties for a desired application, including strength, weight, rigidity, etc. Metal, such as stainless steel, aluminum, etc., is generally preferred. The main body member 28, side walls 30, clamping teeth 56, and flanges 54 are all integrally formed and connected to each other to allow a strong and rigid structural construction of the hold-down clamp 10, 110.

From the foregoing, it will be appreciated that a hold-down clamp according to the present invention creates a deformation on a lower flange of a side rail of a cable tray, thereby allowing the hold-down clamp to firmly and rigidly retain the cable tray on a strut channel.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A hold-down clamp for holding a cable tray on a strut channel, the hold-down clamp comprising:
   a main body member having a first end defining a clamp engagement portion and a second end defining an expansion guide portion, the main body member extending between the first and second ends;

opposed side walls, each of the side walls extending downwardly and perpendicularly from the main body member;

first and second side members extending from each of the opposed side walls, each of the first and second side members including:

a flange having a clamp engagement structure, a planar middle structure, and an expansion guide structure that are integrally connected to each other; and a clamping tooth defined between the clamp engagement structure of the flange and the side wall such that the clamping tooth transitions into the clamp engagement structure of the flange and the side wall of the hold-down clamp.

2. The hold-down clamp of claim 1, wherein a clamping fastener engaged to the clamp engagement portion is configured to move the clamping tooth of the side wall downwardly to exert a strong pressing force for creating a deformation in the cable tray.

3. The hold-down clamp of claim 2, wherein a height of the clamping tooth is equivalent to a distance between a lower edge of the clamp engagement structure of the flange and a bottom of the clamping tooth.

4. The hold-down clamp of claim 2, wherein the hold-down clamp is configured to deform the cable tray for firmly and rigidly retaining the cable tray on the strut channel.

5. The hold-down clamp of claim 1, wherein the main body member is rectangular-shaped with flat top and bottom surfaces.

6. The hold-down clamp of claim 1, wherein a fastener hole is defined in the clamp engagement portion of the main body member, through which a clamping fastener is inserted to tighten the hold-down clamp for holding the cable tray to the strut channel.

7. The hold-down clamp of claim 6, wherein the clamping fastener is a threaded bolt.

8. The hold-down clamp of claim 6, wherein the hold-down clamp further includes first and second anti-rotation embossments, each of which protrudes from an inner surface of each of the side walls, to prevent the hold-down clamp from rotating, moving, and bending as the clamping fastener is tightened.

9. The hold-down clamp of claim 6, wherein the clamping tooth acts as an anti-rotation feature and prevents the hold-down clamp from rotating as the clamping fastener is tightened.

10. The hold-down clamp of claim 1, wherein the clamping tooth is curved.

11. The hold-down clamp of claim 1, wherein the expansion guide and clamp engagement structures are connected to the middle structure via first and second offsets, respectively.

12. The hold-down clamp of claim 11, wherein each of the expansion guide and clamp engagement structures extends away from the first and second offsets, respectively.

13. The hold-down clamp of claim 12, wherein each of the expansion guide and clamp engagement structures extends downwardly with an angle relative to the first offset and the second offset, respectively, such that an obtuse angle is created therebetween.

14. The hold-down clamp of claim 13, wherein the expansion guide structure of the flange is dimensioned such that an expansion guide vertical clearance is created between a bottom of the middle structure and a lower edge of the expansion guide structure, respectively.

15. The hold-down clamp of claim 1, wherein the middle structure of the flange is configured to abut and rest on the strut channel.

16. The hold-down clamp of claim 1, wherein the expansion guide portion of the hold-down clamp is configured for loosely engaging and holding the cable tray to the strut channel.

17. The hold-down clamp of claim 1, wherein, the main body member, side walls, clamping teeth, and flanges are all integrally formed and connected to each other to allow a strong and rigid structural construction of the hold-down clamp.

18. The hold-down clamp of claim 1, wherein the hold-down clamp is made out of metal.

19. A hold-down clamp for holding a cable tray on a strut channel, the hold-down clamp comprising:

a main body member having a first end defining a clamp engagement portion and a second end defining an expansion guide portion, the main body member extending between the first and second ends;

opposed side walls, each of the side walls extending downwardly and perpendicularly from the main body member to define an inner space between the opposed side walls, and each of the opposed side walls having a clamping tooth defined at a bottom thereof and the opposed side walls further including an anti-rotation embossment protruding from an inner surface thereof into the inner space; and opposed flanges, each flange extending from each of the side wall and having a clamp engagement structure, a planar middle structure, and an expansion guide structure that are integrally connected to each other.

20. The hold-down clamp of claim 19, wherein a clamping fastener engaged to the clamp engaging portion is configured to move the clamping tooth of the side wall downwardly to exert a strong pressing force for creating a deformation in of the cable tray.

21. The hold-down clamp of claim 20, wherein a fastener hole is defined in the clamp engagement portion of the main body member, through which the clamping fastener is inserted for tightening the hold-down clamp to hold the cable tray to the strut channel.

22. The hold-down clamp of claim 19, wherein the hold-down clamp is configured to deform the cable tray.

23. The hold-down clamp of claim 19, wherein, the main body member, side walls, clamping teeth, and flanges are all integrally formed and connected to each other to allow a strong and rigid structural construction of the hold-down clamp.

* * * * *